(12) United States Patent
Nishimura

(10) Patent No.: US 8,491,113 B2
(45) Date of Patent: Jul. 23, 2013

(54) INK SET AND IMAGE FORMING METHOD

(75) Inventor: Naoko Nishimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 277 days.

(21) Appl. No.: 13/072,801

(22) Filed: Mar. 28, 2011

(65) Prior Publication Data

US 2011/0242199 A1 Oct. 6, 2011

(30) Foreign Application Priority Data

Mar. 30, 2010 (JP) ................. 2010-079408

(51) Int. Cl.
*C09D 11/00* (2006.01)
(52) U.S. Cl.
USPC ................. 347/96; 347/98; 347/100
(58) Field of Classification Search
USPC ............ 347/21, 28, 95–100; 523/160, 161; 106/13.13, 13.6, 31.65, 31.13, 31.6
See application file for complete search history.

(56) References Cited

U.S. PATENT DOCUMENTS

| | | | |
|---|---|---|---|
| 8,083,342 B2 * | 12/2011 | Morohoshi et al. | 347/101 |
| 2009/0088521 A1 * | 4/2009 | Hosokawa et al. | 524/558 |
| 2009/0098312 A1 * | 4/2009 | Goto et al. | 427/595 |
| 2009/0128611 A1 * | 5/2009 | Kariya et al. | 347/106 |
| 2009/0202724 A1 * | 8/2009 | Arai et al. | 427/256 |
| 2011/0069118 A1 * | 3/2011 | Ohzeki et al. | 347/44 |

FOREIGN PATENT DOCUMENTS

| | | |
|---|---|---|
| JP | 2003-266916 A | 9/2003 |
| JP | 2009-166387 A | 7/2009 |

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

Disclosed is an ink set including: an ink composition containing at least water, a pigment, and a resin at least partially coating a surface of the pigment and having a structural unit represented by the following Formula (1) and a structural unit having an ionic group; and a treatment liquid containing a cationic polymer having reactivity to the pigment at least partially coated with the resin, Formula (1)

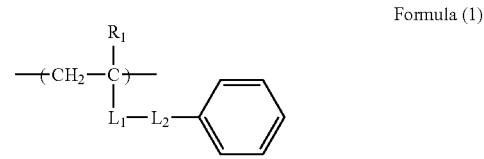

wherein, in Formula (1), $R_1$ represents a hydrogen atom, a methyl group or a halogen atom; $L_1$ represents *—COO—, *—OCO—, *—CONR$_2$—, *—O—, or a substituted or unsubstituted phenylene group; $R_2$ represents a hydrogen atom or an alkyl group having 1 to 10 carbon atoms; the symbol "*" in the $L_1$ represents a bond linked to the main chain; and $L_2$ represents a single bond or a bivalent linking group having 1 to 30 carbon atoms.

11 Claims, No Drawings

INK SET AND IMAGE FORMING METHOD

CROSS-REFERENCE TO RELATED APPLICATION

This application claims priority under 35 USC 119 from Japanese patent Application No. 2010-079408 filed on Mar. 30, 2010, the disclosures of which are incorporated by reference herein.

BACKGROUND OF THE INVENTION

1. Field of the Invention

The present invention relates to an ink set suitable for forming an image and a method for forming an image.

2. Description of the Related Art

Recently, an aqueous colored dispersion in which an insoluble solid such as a pigment is dispersed in water has been actively used for applications such as ink for inkjet recording.

In recent years, a variety of methods have been suggested as image recording methods for recording a color image. In such a method, there is an increasing demand for high quality of recorded materials such as fineness of images, texture, and resistance to water or abrasion or the like.

For example, an inkjet technology is widely applied to the fields such as office and home printers and furthermore has recently been applied to commercial printing fields. For this reason, the demand for quality in recorded materials is having a tendency to further increase. In particular, for stability of images required for recorded materials, more specifically, abrasion resistance or ink ejection stability necessary for image formation, performance improvement is further required.

In this regard, an ink set combining a recording liquid containing a pigment coated with a resin and a treatment liquid containing a cationic compound having reactivity to the resin-coated pigment is disclosed (for example, see Japanese Patent Application Laid-Open (JP-A) No. 2003-266916) and it is believed that printed materials with superior abrasion resistance can be obtained therefrom.

In addition, a method for forming an image wherein an inkjet recording ink using a polymer emulsion in which a pigment is contained in a polymer such as vinyl-based polymer including styrene as a structural unit is ejected to a recording material to which a pretreatment liquid containing a water-soluble organic acid has been applied to form an image is disclosed (for example, see JP-A No. 2009-166387).

However, the conventional ink uses a substance having a styrene-based structural unit as a hydrophobic component of resin components for coating a pigment and abrasion resistance effects thereof to some extent are expected. Recently, required image quality, in particular, abrasion resistance, when external force is applied, has not necessarily been sufficient.

In addition, when the content ratio of resin component in the ink increases in order to improve abrasion resistance, the problem, for example that the ink may be readily adhere to an ejection head is caused by the reasons such as the difficulty of redissolving the adhered ink in the ink. As a result, the ejection of ink cannot be stably maintained and furthermore, the landing position precision of ink is disadvantageously deteriorated.

SUMMARY OF THE INVENTION

According to a first aspect of the invention, there is provided an ink set including: an ink composition containing at least water, a pigment, and a resin at least partially coating a surface of the pigment and having a structural unit represented by the following Formula (1) and a structural unit having an ionic group; and a treatment liquid comprising a cationic polymer having reactivity to the pigment at least partially coated with the resin.

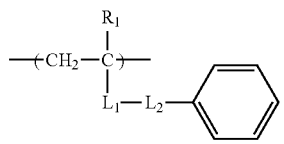

Formula (1)

In the Formula (1), $R_1$ represents a hydrogen atom, a methyl group or a halogen atom;

$L_1$ represents *—COO—, *—COO—, *—CONR$_2$—, *—O—, or a substituted or unsubstituted phenylene group;

$R_2$ represents a hydrogen atom or an alkyl group having 1 to 10 carbon atoms;

the symbol "*" in the $L_1$ represents a bond linked to the main chain; and $L_2$ represents a single bond or a bivalent linking group having 1 to 30 carbon atoms.

According to a second aspect of the invention, there is provided a method for forming an image using the ink set according to the first aspect including: applying the ink composition of the ink set to a recording medium by inkjetting; and applying the treatment liquid of the ink set to the recording medium.

DETAILED DESCRIPTION OF THE INVENTION

Hereinafter, the ink set and the method for forming an image of the present invention will be described in detail.

<Ink Set>

The ink set of the present invention is constituted by preparing an ink composition containing at least water, a pigment, and a resin at least partially coating a surface of the pigment and having a structural unit represented by the following Formula (1) and a structural unit having an ionic group, and a treatment liquid containing a cationic polymer having reactivity to the pigment at least partially coated with the resin.

The present invention is composed of two liquids using an ink composition to form a color image and a treatment liquid acting on the ink composition. In the ink composition, a specific structure in which an aromatic ring is not directly bonded to a polymer main chain is applied to a resin component to coat the pigment, and in the treatment liquid, a cationic compound is used as the component coming in contact with the pigment coated with resin component. As a result, as compared to conventional ink sets, the resin component used to coat the pigment is structurally readily adsorbed to the pigment, when the treatment liquid comes in contact with the resin component, the components of the ink composition exhibit superior aggregability, and the abrasion resistance of images remarkably improves. In addition, ejection defects are improved and the landing position precision of ink is thus improved, and decolorization defects (white spots) of images (in particular, white spots of images in the case of using ink after storage) are efficiently prevented.

Accordingly, it is possible to stably provide an image with high resolution, superior abrasion resistance and excellent image quality for a long period of time.

—Ink Composition—

According to the present invention, the ink composition contains at least water, a pigment, and a resin at least partially coating a surface of the pigment and having a structural unit represented by the following Formula (1) and a structural unit having an ionic group. The ink composition may optionally further contain other components such as a water-soluble organic solvent or a surfactant.

(Pigment)

The ink composition of the present invention contains at least one pigment. The pigment is not particularly limited and may be appropriately selected according to the intended use. The pigment may be an organic pigment or an inorganic pigment.

Examples of the organic pigments include azo pigments, polycyclic pigments, colorant chelates, nitro pigments, nitroso pigments, aniline black and the like. Of these, azo pigments, polycyclic pigments and the like are more preferable. Examples of the azo pigments include azo lakes, insoluble azo pigments, condensed azo pigments, chelate azo pigments and the like. Examples of the polycyclic pigments include phthalocyanine pigments, perylene pigments, perinone pigments, anthraquinone pigments, quinacridone pigments, dioxazine pigments, indigo pigments, thio indigo pigments, isoindolinone pigments, and quinophthalone pigments and the like. Examples of the dye chelates include basic dye chelates and acidic dye chelates.

Examples of the inorganic pigments include titanium oxide, iron oxide, calcium carbonate, barium sulfate, aluminum hydroxide, barium yellow, cadmium red, chrome yellow, carbon black and the like. Of these, carbon black is particularly preferable. The carbon black may be produced by a known method such as a contact method, a furnace method or a thermal method.

The pigment may be used alone or in combination of two or more thereof.

From the viewpoints of ink coloring properties, storage stability and the like, the content of the pigment in the ink composition is preferably from 0.1% by mass to 20% by mass, and more preferably from 0.2% by mass to 15% by mass, and particularly preferably from 0.5% by mass to 10% by mass, with respect to the total solid mass of the ink composition.

(Resin)

In the present invention, the ink composition contains at least one resin at least partially coating a surface of the pigment and having a structural unit represented by the Formula (1) and a structural unit having an ionic group (hereinafter, also referred to "the resin of the present invention"). The ink set of the present invention uses the cationic polymer contained in the treatment liquid and the resin having a structural unit represented by the Formula (1) and a structural unit having an ionic group in the ink composition, thus improving aggregability during image formation. As a result, abrasion resistance of images is remarkably improved. In addition, the landing position precision of ink drops increases due to improvement of ejection defects and defects such as white spots caused by ejection defects are thus prevented.

This resin partially or entirely coats the surface of pigment, and more specifically, is preferably used as a dispersant of the pigment.

—Structural Unit Represented by Formula (1)—

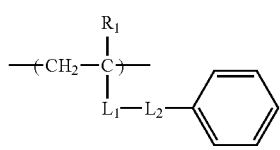

Formula (1)

In the Formula (1), $R_1$ represents a hydrogen atom, a methyl group or a halogen atom (such as a chlorine, bromine or iodine atom). $L_1$ represents *—COO—, *—OCO—, *—$CONR_2$—, *—O—, or a substituted or unsubstituted phenylene group. $R_2$ represents a hydrogen atom or an alkyl group having 1 to 10 carbon atoms. The symbol "*" in the $L_1$ represents a bond linked to the main chain. $L_2$ represents a single bond or a bivalent linking group having 1 to 30 carbon atoms.

The structural unit represented by Formula (1) (repeating unit) is a hydrophobic structural unit.

Specifically, the structure in which a phenyl group (benzene ring) as the hydrophobic functional group is linked through a linking group represented by "-$L_1$-$L_2$-" to a main chain is formed. Due to this structure, the distance between the phenyl group as the hydrophobic functional group and the ionic group as described below in the resin is suitably maintained. For this reason, interaction between the resin and the pigment readily occurs and the two components are firmly adsorbed and, as a result, dispersibility of the pigment is improved.

In the Formula (1), $R_1$ is preferably a hydrogen atom or a methyl group.

Examples of the substituent group of the substituted phenylene group in $L_1$ include, but are not particularly limited thereto, a halogen atom, an alkyl group, an alkoxy group, a hydroxyl group, a cyano group and the like. For $L_1$, *—COO— is preferable.

The divalent linking group represented by $L_2$ may be saturated or unsaturated and may have a linear, branched or cyclic structure. In addition, the divalent linking group may contain a hetero atom selected from O, N, and S.

$L_2$ is preferably a divalent linking group having 1 to 25 carbon atoms, more preferably a divalent linking group having 1 to 20 carbon atoms, even more preferably a divalent linking group, having 1 to 15 carbon atoms, particularly preferably a divalent linking group having 1 to 12 carbon atoms. Specifically, the divalent linking group represented by $L_2$ is an alkylene group or an oxyalkylene group having 1 to 25 carbon atoms, more preferably an alkylene group or an oxyalkylene group having 1 to 20 carbon atoms, even more preferably an alkylene group or an oxyalkylene group having 1 to 15 carbon atoms, particularly preferably an alkylene group or an oxyalkylene group having 1 to 12 carbon atoms. Herein, the direction of the oxyalkylene group is preferably the same as the direction in which the oxygen atom contained therein is bonded to the phenyl group in the Formula (1).

In the Formula (1), it is preferable that $R_1$ represents a hydrogen atom or a methyl group, $L_1$ represents *—COO—, and $L_2$ is a structural unit of a divalent linking group having 1 to 15 carbon atoms, and it is more preferable that $R_1$ is a hydrogen atom or a methyl group, $L_1$ represents *—COO— and $L_2$ represents a structural unit of an alkylene group or an oxyalkylene group having 1 to 12 carbon atoms.

The structural unit represented by Formula (1) is preferably a structural unit derived from the following corresponding monomers (that is, a structural unit formed by polymerizing the corresponding monomers). That is, the corresponding monomer may be at least one selected from benzyl (meth)acrylate, phenoxyethyl(meth)acrylate, phenethyl(meth)acrylate, and oligo (structural unit number is about from 2 to 6) ethylene glycol monophenylether(meth)acrylate. In addition, in the present invention, (meth)acrylate represents acrylate or methacrylate and (meth)acrylic acid represents acrylic acid or methacrylic acid.

The corresponding monomer is preferably benzyl (meth)acrylate, phenethyl(meth)acrylate, or phenoxyethyl(meth)acrylate, from the viewpoints of dispersion stability and ejection stability.

From the viewpoints of dispersibility of the pigment, the content ratio of the structural unit represented by Formula (1) in the resin is preferably from 50% by mass to 95% by mass with respect to the total mass of the resin.

Specifically, in the case where the resin is only composed of the structural unit represented by Formula (1) and the structural unit having an ionic group (that is, in the case of not including the following other structural units), from the viewpoints of dispersibility of pigment, the content ratio of the structural unit represented by Formula (1) is preferably from 70% by mass to 95% by mass with respect to the total mass of the resin, and more preferably from 80% by mass to 95% by mass. In addition, in the case where the resin contains the following other structural units, from the viewpoints of dispersibility of the pigment, the structural unit represented by Formula (1) is preferably from 50% by mass to 80% by mass and more preferably from 60% by mass to 80% by mass, with respect to the total mass of the resin.

—Structural Unit Having an Ionic Group—

The structural unit (repeating unit) having an ionic group is a hydrophilic structural unit. Due to this structural unit, dispersibility of pigment in the ink composition containing water is improved.

Examples of the ionic group include anionic groups such as a carboxylic group, a sulfonic acid group and phosphoric acid group. Of these, the ionic group is preferably at least one anionic group selected from a carboxylic group, a sulfonic acid group and a phosphoric acid group. The structural unit having an ionic group may be a structural unit obtained by polymerizing ionic group-containing monomers or a structural unit obtained by incorporating an ionic group (anionic group) into a polymer chain having no ionic group.

Examples of ionic group-containing monomers constituting the structural unit having an ionic group include anionic group-containing monomers. Examples of these monomers are described below, but the present invention is not limited thereto.

Of the anionic group-containing monomers, examples of those containing a carboxyl group include unsaturated carboxylic acid monomers such as acrylic acid, methacrylic acid, crotonic acid, itaconic acid, maleic acid, fumaric acid, and citraconic acid, β-carboxyethylacrylic acid, and 2-methacryloyloxymethylsuccinic acid. Examples of the sulfonic acid group-containing monomer include styrenesulfonic acid, 2-acrylamide-2-methylpropanesulfonic acid, 3-sulfopropyl(meth)acrylate, and bis-(3-sulfopropyl)itaconic acid ester. Examples of the phosphoric acid group-containing monomer include vinylphosphonic acid, vinyl phosphate, bis(methacryloxyethyl)phosphate, diphenyl-2-acryloyl oxyethyl phosphate, diphenyl-2-methacryloyloxy ethyl phosphate, and dibutyl-2-acryloyl oxyethyl phosphate and the like.

Of these, anionic monomers are preferable. From the viewpoints of ink viscosity and ejection property, unsaturated carboxylic acid monomers are preferable and acrylic acid and methacrylic acid are particularly preferable. In addition, the ionic group-containing monomer may be used alone or in combination of two or more thereof.

Independent of the fact of whether or not the following other structural unit is included, from the viewpoints of dispersibility of the pigment, the content ratio of "the structural unit having an ionic group" is preferably from 2% by mass to 20% by mass with respect to the total mass of the resin, more preferably from 2% by mass to 15% by mass, particularly preferably, from 5% by mass to 15% by mass.

When the content is within the range above, dispersibility of the pigment and ejection stability of ink are further improved.

In the present invention, the acid value of the resin is preferably from 30 mg KOH/g to 95 mg KOH/g, more preferably from 45 mg KOH/g to 85 mg KOH/g, particularly preferably from 55 mg KOH/g to 80 mg KOH/g.

In addition, the term "acid value" is defined as a mass (mg) of KOH required for completely neutralizing 1 g of a resin, which is measured by the method described in Japanese Industrial Standard (JIS K 0070:1992).

When the acid value of resin is 30 mg KOH/g or higher, precipitation over time does not readily occur and stable storage can be realized due to the charge repulsion of the dispersion caused by dissociated carboxyl groups. On the other hand, when the acid value of resin is 95 mg KOH/g or lower, the resin does not become excessively hydrophilic and adsorbs the colorant, thus causing good dispersibility.

In addition, the resin of the present invention is preferably water-soluble. The term "water-soluble" as used herein means that the dissolved amount of the polymer (B) is 1 g or higher with respect to 100 g of water after 100% neutralizing with sodium hydroxide, preferably 5 g or higher with respect to 100 g of water, more preferably 10 g or higher with respect to 100 g of water.

The resin of the present invention may contain a structural unit (hereinafter, referred to as "structural unit (c)") which has a structure different from the structural unit represented by Formula (1) and the structural unit having an ionic group.

In the case where the structural unit (c) is a structural unit which has a structure different from the structural unit represented by Formula (1) and the structural unit having an ionic group, the structural unit (c) may be a hydrophobic structural unit or a hydrophilic structural unit. In addition, the structural unit (c) may be composed of a single structural unit, two or more structural units, or both a hydrophilic structural unit and a hydrophobic structural unit.

The resin contains the structural unit (c), thus exhibiting superior dispersibility. The mechanism is specifically unclear, but is envisaged as follows.

That is, the resin contains two mutually contradictory structural units, i.e., "structural unit represented by Formula (1)" exhibiting affinity to the colorant, and "structural unit having an ionic group" exhibiting affinity to an aqueous medium. Since the resin contains the structural unit (c), it is offset that the structural unit represented by Formula (1) and the structural unit having an ionic group inhibit each other's functions, and thus obtains superior dispersibility. It is presumed that the resin contains the structural unit (c) having intermediate properties between the structural unit represented by Formula (1) and the structural unit having an ionic group, thus exhibiting good dispersibility.

The structural unit (c) is preferably contained in an amount higher than 30% by mass based on the total mass of the resin, more preferably in an amount higher than 30% by mass and not higher than 50% by mass, even more preferably in an amount higher than 33% by mass and not higher than 40% by mass, particularly preferably in an amount not lower than of 33% by mass and not higher than 37% by mass.

When the structural unit (c) is hydrophobic structural unit, the structural unit (c) may be formed through polymerization of a corresponding monomer, or introduction of a hydrophobic functional group to the polymer chain after polymerization. Any monomer for forming the hydrophobic structural unit (c) may be selected from any known monomers without particular limitation as long as it contains a polymerizable functional group and a hydrophobic functional group.

From the viewpoints of availability, handleability, and versatility, the monomer for forming the hydrophobic structural unit is preferably selected from vinyl monomers (such as (meth)acrylates, (meth)acrylamides, styrenes and vinyl esters). Examples of the (meth)acrylates include alkyl(meth)acrylates such as methyl(meth)acrylate, ethyl(meth)acrylate, (iso)propyl(meth)acrylate, (iso- or tertiary-)butyl(meth)acrylate, 2-ethylhexyl(meth)acrylate, (iso)octyl(meth)acrylate, (iso)decyl(meth)acrylate, and (iso)stearyl(meth)acrylate. Of these, alkyl esters of (meth)acryl acid, an alkyl group of the alkyl ester having from 1 to 6 carbon atoms, are preferable, and alkyl esters of (meth)acryl acid, an alkyl group of the alkyl ester having from 1 to 4 carbon atoms, are more preferable.

Examples of the (meth)acrylamides include N-methyl (meth)acrylamide, N-ethyl(meth)acrylamide, N-propyl (meth)acrylamide, N-isopropyl(meth)acrylamide, N-n-butyl acryl(meth)amide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, vinyl(meth)acrylamide, N,N-diallyl(meth)acrylamide, and N-allyl(meth)acrylamide. Of these, (meth)acrylamide and N,N-dimethyl(meth)acrylamide are preferable.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected with a group capable of deprotecting by an acidic substance (for example, t-Boc), methyl vinyl benzoate, α-methylstyrene, and vinylnaphthalene and the like. Of these, styrene and α-methylstyrene are preferable.

Examples of the vinyl esters include vinyl esters such as vinyl acetate, vinyl chloroacetate, vinyl propionate, vinyl butylate, vinyl methoxy acetate, and vinyl benzoate. Of these, vinyl acetate is preferable.

When the structural unit (c) is hydrophobic structural unit, it is preferably a structural unit derived from alkyl esters of (meth)acryl acid, an alkyl group of the alkyl ester having from 1 to 6 carbon atoms, and particularly preferably a structural unit derived from alkyl esters of (meth)acryl acid, an alkyl group of the alkyl ester having from 1 to 4 carbon atoms. The structural unit (c) is more preferably a structural unit derived from methyl acrylate, methyl methacrylate, ethyl acrylate, or ethyl methacrylate, most preferably, a structural unit derived from methyl methacrylate.

The resin in the invention may be a random copolymer wherein the structural units are randomly introduced, or a block copolymer wherein the structural units are regularly introduced. When the resin is a block copolymer, the order of the introduction of the structural units is arbitrary, and the copolymer may contain two or more blocks of identical components. From the viewpoints of versatility and manufacturability, a random copolymer is preferable.

The weight average molecular weight (Mw) of the resin used in the invention is preferably from 10,000 to 300,000, more preferably from 20,000 to 200,000, and even more preferably from 30,000 to 100,000, from the viewpoint of steric repulsion effect. A molecular weight within the above-described range is preferable from the viewpoints that the resin exhibits good steric repulsion effect as a dispersant, and the steric effect reduces the time necessary for the adsorption to a colorant. In addition, the resin has a molecular weight of 100,000 or less, thus preventing solution viscosity from being excessively high and making it easy to handle. The resin has a molecular weight of 30,000 or more, thus improving stability over time.

The molecular weight distribution (represented as weight average molecular weight/number average molecular weight) of the polymer used in the invention is preferably from 1 to 6, and more preferably from 1 to 4. A molecular weight distribution within the above-described range is preferable from the viewpoints that the time necessary for the dispersion of the pigment is reduced, and the stability over time of the dispersion is improved.

The number average molecular weight and weight average molecular weight are determined by differential refractometer detection with THF as a solvent in a GPC analyzer using columns of TSKgel GMHxL, TSKgel G4000HxL, and TSKgel G2000HxL (trade names, all are manufactured by Tosoh Corporation). For the conversion, polystyrene was used as the reference material.

The resin used in the invention may be synthesized by various polymerization methods, for example, solution polymerization, precipitation polymerization, suspension polymerization, precipitate polymerization, bulk polymerization, or emulsion polymerization. The polymerization reaction may be carried out under a known system, such as a batch, semi-continuous, or continuous system.

Initiation of the polymerization may be carried out with a radical initiator, or photoirradiation or irradiation. These methods of polymerization and initiation of polymerization are described in, for example, "Polymer synthesis method" by Teiji Tsuruta, Revised Edition (published by Nikkan Kogyo Shimbun, Ltd., 1971) and "Experimental method of polymer synthesis" by Takayuki Otsu and Masaetsu Kinoshita (published by Kagaku-Dojin Publishing Co., Inc., 1972) pp. 124 to 154.

Among these polymerization methods, a solution polymerization method using a radical initiator is preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used alone or in combination of two or more thereof, or may be mixed with water.

The polymerization temperature is determined in consideration of the molecular weight of the intended polymer and the type of the initiator. The polymerization temperature is usually from 0° C. to 100° C., and is preferably from 50° C. to 100° C. The reaction pressure may be appropriately selected, and is usually from 1 kg/cm² to 100 kg/cm², and particularly preferably from 1 kg/cm² to 30 kg/cm². The reaction period may be about 5 hours to 30 hours. The resulting polymer may be subjected to purification treatment such as reprecipitation.

Specific examples of preferable resin in the invention are shown below. The invention is not limited to these examples.

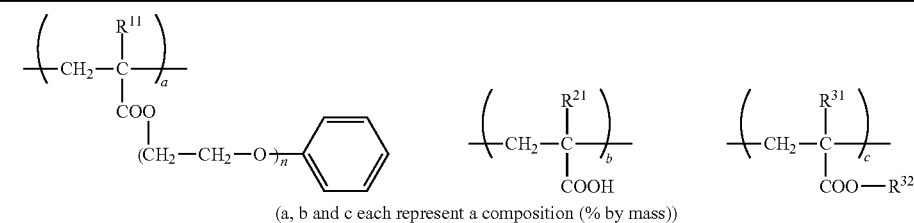

(a, b and c each represent a composition (% by mass))

|     | $R^{11}$ | n | $R^{21}$ | $R^{31}$ | $R^{32}$ | a | b | c | Mw |
|-----|---------|---|---------|---------|---------|-----|-----|-----|-------|
| B-1 | $CH_3$ | 1 | $CH_3$ | $CH_3$ | $-CH_3$ | 60 | 9 | 31 | 35500 |
| B-2 | H | 1 | H | H | $-CH_2CH_3$ | 69 | 10 | 21 | 41200 |

-continued

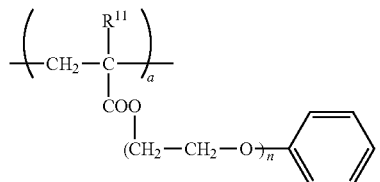 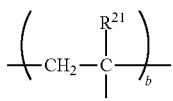 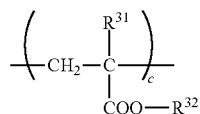

(a, b and c each represent a composition (% by mass))

| | $R^{11}$ | n | $R^{21}$ | $R^{31}$ | $R^{32}$ | a | b | c | Mw |
|---|---|---|---|---|---|---|---|---|---|
| B-3 | $CH_3$ | 2 | $CH_3$ | $CH_3$ | —$CH_3$ | 70 | 11 | 19 | 68000 |
| B-4 | $CH_3$ | 4 | $CH_3$ | $CH_3$ | —$CH_2(CH_2)CH_3$ | 70 | 7 | 23 | 72000 |
| B-5 | H | 5 | H | H | —$CH_3$ | 70 | 10 | 20 | 86000 |
| B-6 | H | 5 | H | H | —$CH_2CH(CH_3)CH_3$ | 70 | 2 | 28 | 42000 |
| B-7 | $CH_3$ | 1 | $CH_3$ | $CH_3$ | —$CH_2CH_3$ | 50 | 11 | 39 | 44500 |
| B-8 | $CH_3$ | 1 | $CH_3$ | $CH_3$ | —$CH_2CH_3$ | 50 | 10 | 40 | 51200 |
| B-9 | H | 1 | H | H | —$CH_2CH_3$ | 45 | 11 | 44 | 48900 |
| B-10 | H | 1 | $CH_3$ | $CH_3$ | —$CH_2CH_3$ | 45 | 12 | 43 | 43600 |
| B-11 | $CH_3$ | 1 | $CH_3$ | $CH_3$ | —$CH_3$ | 67 | 13 | 20 | 49400 |

B-12

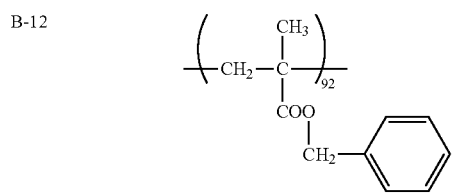 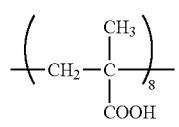

Mw = 4530C

For the present invention, the content of the resin in the ink composition is preferably from 0.01% by mass to 10% by mass with respect to the total solid mass of pigment in the ink, and more preferably, from 0.02% by mass to 5.0% by mass. When the content of the resin in the present invention is 0.01% by mass or more, dispersibility of the pigment is good and aggregability is excellent when the ink composition contacts with the treatment liquid. When the content of resin is 5.0% by mass or less, it is advantageous in that liquid properties such as drying rate of the aqueous colorant dispersion, permeability into adherends and viscosity can be suitably controlled.

—Method for Preparing Pigment Dispersion—

A method for preparing the pigment at least partially coated with the resin according to the present invention (hereinafter, simply referred to as "resin-coated pigment") is not particularly limited. For example, the pigment dispersion may be prepared by dispersing the pigment using the resin of the present invention as a dispersant. In this case, for example, the ink composition may be prepared by mixing the obtained pigment dispersion and water with or without the use of water-soluble organic solvent and/or resin particles.

By preparing the aforementioned method, pigment particles with a fine particle size can be present and high dispersion stability after dispersion can be obtained. In this case, the whole of the particle surface of the pigment is not necessarily coated with the resin, and in some cases, the particle surface of the pigment may be at least partially coated with the resin.

The preparation of the pigment dispersion may be carried out using, for example, phase-transfer emulsification.

Specifically, for example, the preparation may be carried out by mixing a pigment, the resin of the present invention, as a dispersant, water and a non-water-soluble volatile solvent, followed by dispersing, to obtain a dispersion, and partially or entirely removing the non-water-soluble volatile solvent from the obtained dispersion. At this time, the anionic group of the non-water-soluble resin may be partially or entirely neutralized by addition of a basic compound. By adjusting neutralization conditions, it is possible to realize good dispersibility. Examples of the basic compound include sodium hydroxide and the like. At this time, alkylene oxide additive of glycerin may be added together with the non-water-soluble volatile solvent.

The dispersion may be carried out by any known method, a mixing stirring apparatus, or dispersion apparatus to perform dispersion under dispersing or stirring after mixing desired components. The dispersion may be carried out using, for example, a ball mill, a roll mill, a bead mill, a high-pressure homogenizer, a high-speed stirring disperser, or an ultrasonic homogenizer.

—Pigment Dispersant—

The preparation of the pigment dispersion may be carried out using the resin of the present invention as a dispersant, or in combination with other pigment dispersants. Other pigment dispersants may be suitably selected from compounds capable of dispersing a pigment in water. Examples of pigment dispersants include nonionic compounds, anionic compounds, cationic compounds, ampholytic compounds and the like.

—Non-Water-Soluble Volatile Solvent—

The pigment dispersion may be prepared using at least one non-water-soluble volatile solvent. Since the non-water-soluble volatile solvent has a small influence on dispersibility, good dispersibility is maintained in the process of dispersion. Finally, a pigment dispersion which can be concentrated under good dispersability and exhibits storage stability for a long period of time can be obtained by removing partially or entirely the non-water-soluble volatile solvent. In addition, in the case where an ink composition is prepared and used for recording, ejection stability is excellent and images can be recorded while inhibiting generation of curling.

In addition, the term "non-water-soluble" refers to a property in which, in the case where a substance is softly mixed with an equivalent amount of pure water at one atmosphere and at a temperature of 20° C., the mixed solution does not exhibit homogeneous appearance even after flow is stabilized. A degree of solubility in water is preferably 80 g/100 ml or less at 20° C., more preferably, 50 g/100 ml or less at 20° C.

In addition, the term "volatility" refers to a property of a substance having a boiling point of 200° C. or lower, more preferably, of 150° C. or lower.

The non-water-soluble volatile solvent may be arbitrarily selected from non-water-soluble and volatile organic solvents. Specifically, examples of non-water-soluble volatile solvent include ketone solvents (such as methyl ethyl ketone or diethyl ketone) and ether solvents (such as dibutylether). Of these, from the viewpoints that the dispersion stability is obtained, a ketone solvents are preferable, and methyl ethyl ketone is most preferable.

From the viewpoints that dispersibility and stability after dispersion are excellent, ejection stability in the case of using as the ink composition for recoding is obtained, and curling is inhibited, the amount of non-water-soluble volatile solvent used is preferably 10% by mass to 1000% by mass, more preferably 50% by mass to 800% by mass, particularly preferably 100% by mass to 500% by mass, with respect to the amount of alkylene oxide additive of glycerin used.

It is preferable that the aforementioned non-water-soluble volatile solvent be partially or entirely removed from the ink after the pigment is dispersed. As a result, the concentrated pigment dispersion can be thus obtained by reducing unnecessary non-water-soluble volatile solvent, while maintaining pigment dispersion and long-period storage stability. In addition, in the case where the solvent is used for preparation of pigment ink to record images, ejection stabilization is facilitated and generation of curling after recording can be inhibited. The removal of non-water-soluble volatile solvent is performed by a common method such as heating, drying treatment such as air-blasting, distillation under reduced pressure, and the dispersion may be concentrated and phase-inverted to an aqueous medium by distilling off the non-water-soluble volatile solvent from the dispersion obtained by the dispersion process. In this case, when the resin of the present invention is used as a pigment dispersant, a dispersion of resin-coated pigment particles in which the surface of pigment particles is coated with the resin can be obtained.

It is preferable that, after the non-water-soluble volatile solvent is removed, the non-water-soluble volatile solvent in the prepared pigment dispersion is substantially removed. The residue amount of non-water-soluble volatile solvent in the pigment dispersion is preferably 5% by mass or less of the mixed amount during dispersion, from the viewpoints of concentration of pigment dispersion, ejection stability in the case of using for the ink composition, and inhibition of curling.

At this time, the residue amount of the non-water-soluble volatile solvent (in particular, methyl ethyl ketone) in the pigment dispersion is preferably 5 ppm to 400 ppm, based on the mass. In addition, the content of the non-water-soluble volatile solvent (in particular, methyl ethyl ketone) in the ink composition is preferably 10 ppm to 100 ppm, based on the mass, more preferably 10 ppm to 50 ppm, based on the mass.

The average particle diameter of resin-coated pigment particles in the pigment dispersion is preferably in the range of from 30 nm to 200 nm, more preferably, from 50 nm to 150 nm. When the average particle diameter is 30 nm or higher, manufacturability is improved, and when the average particle diameter is 200 nm or less, storage stability is good. In addition, the particle diameter distribution of resin-coated pigment particles is not particularly limited, and may have a broad particle diameter distribution or a monodispersed particle diameter distribution.

In addition, the average particle diameter and particle diameter distribution of the pigment particles were obtained by measuring the volume average particle diameter using a NANOTRAC particle size distribution analyzer (trade name: UPA-EX150, manufactured by Nikkiso Co., Ltd.) by a dynamic light scattering method.

The content of the pigment whose surface is at least partially coated with the resin of the present invention in the ink composition is not particularly limited, and is preferably 0.05% by mass to 30% by mass with respect to the total solid mass of the ink composition, more preferably, 0.1% by mass to 20% by mass, particularly preferably, 0.15% by mass to 15% by mass. When the content is 0.05% by mass or higher, coloring performance of ink can be further improved. In addition, when the content is 30% by mass or lower, increase of ink viscosity can be further efficiently inhibited and deterioration in properties such as ejection stability can be further efficiently inhibited.

(Water)

The ink composition contains water and the amount of water is not particularly limited. In particular, the amount of water, from the viewpoints that stability and ejection reliability are secured, is preferably from 10% by mass to 99% by mass with respect to the total mass of the ink composition, more preferably from 30% by mass to 80% by mass, even more preferably, from 30% by mass to 70% by mass.

(Water-Soluble Organic Solvent)

It is preferable that the ink composition of the present invention contains at least water and furthermore, preferably contain a water-soluble organic solvent. The water-soluble organic solvent, for example, can contribute to anti-drying, wetting or permeation promotion of ink composition. Specifically, for example, in the case where the water-soluble organic solvent is added as an anti-drying agent or a humectant, clogging of inkjet nozzles caused by drying of the inkjet ink at the nozzle injection ports can be prevented.

The ink composition contains a water-soluble organic solvent having a lower vapor pressure than water, thus obtaining anti-drying or wetting effects. In addition, in the case where the water-soluble organic solvent is added as a penetration enhancing agent, it can promote the penetration of the ink composition into paper.

Examples of the water-soluble organic solvent include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropyleneglycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, maltose, cellobiose, lactose, sucrose, trehalose, and maltotriose; sugar alcohols; alkyl alcohols having from 1 to 4 carbon atoms, such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane. These water-soluble organic solvents may be used alone or in combination of two or more thereof.

The polyhydric alcohols are useful in that they exhibit anti-drying or wetting effects of the ink composition. Examples of the polyhydric alcohols include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These polyhydric alcohols may be used alone or in combination of two or more thereof.

A polyol compound is suitable for use in the penetrating agent of the ink composition. Examples of aliphatic diols of polyol compounds include 2-methyl-1,3-propandiol, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. Of these, 2-methyl-1,3-hexanediol, 2-ethyl-1,3-hexanediol, and 2,2,4-trimethyl-1,3-pentanediol are preferable.

The water-soluble organic solvent may be used alone or in combination of two or more thereof.

The content of the water-soluble organic solvent in the ink composition is preferably from 1% by mass to 30% by mass, more preferably from 1% by mass to 20% by mass, particularly preferably from 1% by mass to 10% by mass, with respect to the total mass of the ink composition.

When the content of water or water-soluble organic solvent falls is within this range, ink drying speed, permeability through the adherend, and liquid properties such as viscosity can be controlled to suitable states.

(Resin Particles)

The ink composition of the present invention preferably contains at least one type of resin particle. When the ink composition contains resin particles, adherence (fixing properties) to an image recording medium or durability such as abrasion resistance of images can be improved.

Examples of resin particles include acrylic resins, vinyl acetate-based resins, styrene-butadiene-based resins, vinyl chloride-based resins, acryl-styrene-based resins, butadiene resins, styrenic resins, crosslinked acrylic resins, crosslinked styrenic resins, benzoguanamine resins, phenolic resins, silicone resins, epoxy resins, urethane-based resins, paraffin-based resins and fluorine-based resins. Of these, acrylic resins, acryl-styrene-based resins, styrenic resins, crosslinked acrylic resins and crosslinked styrenic resins are preferable.

The molecular weight of the resin particles is preferably from 10,000 to 200,000, and more preferably from 100,000 to 200,000.

The average particle diameter (volume average particle diameter) of resin particles is preferably from 10 nm to 1 μm, more preferably from 10 nm to 200 nm, even more preferably from 20 nm to 100 nm, and particularly preferably from 20 nm to 50 nm. In addition, the resin particles are not particularly limited as to their particle diameter distribution, and may have a broad particle diameter distribution or a monodispersed particle diameter distribution. Alternatively, a mixture of two or more kinds of resin particles each having a monodispersed particle diameter distribution may be used.

The glass transition temperature (Tg) of the resin particles is preferably 30° C. or higher, more preferably 40° C. or higher, and even more preferably 50° C. or higher.

The content amount of the resin particles in the ink composition is preferably from 0.5% by mass to 20% by mass, more preferably from 3% by mass to 20% by mass, and even more preferably from 5% by mass to 15% by mass, with respect to the total solid mass of the ink composition.

The resin particles are preferably latex-derived particles dispersed in an aqueous medium, that is, contain in the form of a latex in the ink composition. The term "aqueous medium" as used herein refers to water and a water-soluble organic solvent optionally used.

The ink composition contains resin particles through mixing of latex, thus further improving fixing property on recording medium of images and abrasion resistance. That is, when the ink composition contains resin particles, the pigment is accepted in or under a hydrophobic resin film formed on the recording medium when an image is formed thereon and is thus protected.

In addition, the latex includes latexes prepared by dispersing resin particles in an aqueous medium and latexes using a monomer emulsion containing at least one monomer to form resin particles via polymerization or copolymerization. Examples of monomers that can be used include styrene, alkyl(meth)acrylate having 1 to 8 carbon atoms, ethylene glycol(meth)acrylate, ethylene glycol(meth)acrylate, ethylene glycoldi(meth)acrylate, (meth)acrylic acid and the like.

(Surfactant)

The ink composition of the present invention preferably contains at least one surfactant.

Examples of surfactants include acetylene glycol surfactants represented by the following Formula (11) (for example, OLFINE Y, OLFINE E1010, OLFINE STG and the like; and Surfynol 82, Surfynol 104, Surfynol 440, Surfynol 465, Surfynol 485 and the like; and Surfonyl 61 and the like (all the above products being manufactured by Nissin Chemical Industry Co., Ltd.)), and polysiloxane compounds represented by the following Formula (12) (for example, silicone surfactants, BYK-345, BYK-346, BYK-347 or BYK-348 manufactured by BYK Japan KK).

In addition to the surfactants, anionic surfactants (such as sodium dodecylbenzenesulfonate, sodium laurylate, and ammonium salts of polyoxyethylene alkyl ether sulfates), and nonionic surfactants (such as polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides) may be used.

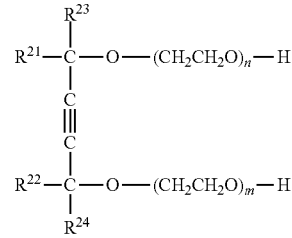

(11)

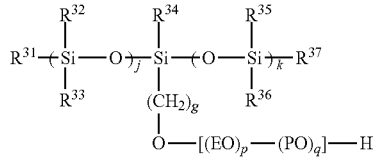

(12)

In the Formula (11), m and n satisfy $0 \leq m+n \leq 50$, from $R^{21}$ to $R^{24}$ each independently represent an alkyl group having 1 to 6 carbon atoms. In the Formula (12), from $R^{31}$ to $R^{37}$ each independently represent an alkyl group having 1 to 6 carbon atoms, j, k and g each independently represent an integer of 1 or higher, EO represents an ethyleneoxy group, PO represents a propyleneoxy group, and p and q represent an integer of 0 or higher. Provided that p+q is an integer of 1 or higher, EO and PO may be present randomly or in the form of a block in the symbol [ ], regardless of their arrangement sequence.

The surfactant may be used alone or in combination of two or more thereof.

The content of surfactant in the ink composition is preferably 0.01% by mass to 10% by mass, more preferably 0.1% by mass to 5% by mass, with respect to the total mass of the ink composition.

(Other Additives)

The ink composition of the present invention may optionally contain, in addition to the components, other additives. Examples of other additives include known additives such as solid wetting agents (for example, urea or derivatives thereof, saccharides, sugar alcohols, hyaluronic acids, polyalcohols and the like), thickening agents (for example, polyvinyl alcohols, polyvinylpyrrolidone, polyoxyalkylene glycols), antifading agents, emulsification stabilizers, ultraviolet absorbers, preservatives, fungicides, pH controlling agents, surface tension regulators, anti-foaming agents, viscosity regulators, dispersion stabilizers, rust preventives, chelating agents and the like.

The various additives may be directly added after or during preparation of the ink composition. Specifically, examples of other additives include those described in paragraphs [0153] to [0162] of JP-A No. 2007-100071.

—Physical Properties—

The surface tension of the ink composition in the invention is preferably 40 mN/m or less, more preferably from 28 mN/m to 35 mN/m, from the viewpoints of good diffusion of dots on a recording medium, prevention of color bleeding and drying property or the like.

The surface tension is measured at 25° C. using a measurement apparatus such as Face Automatic Surface Tensiometer CPVP-Z (manufactured by Kyowa Interface Science Co., Ltd.).

From the viewpoints of ejection stability and the rate of aggregation, the viscosity of the ink composition is preferably from 1 to 30 mPas, more preferably from 1 to 20 mPas, even more preferably from 2 to 15 mPas, particularly preferably from 2 to 10 mPas.

The viscosity may be measured at 25° C. using, for example, a TV-22 viscometer (manufactured by Toki Sangyo Co., Ltd.).

From the viewpoints of stability of the composition, the ink composition preferably has a pH of 7.5 to 10, more preferably from 8 to 9.

The pH may be measured with a pH meter (trade name: MM-60R, multi-function water quality meter manufactured by DKK-Toa Corporation) commonly used at 25° C.

In addition, pH may be suitably controlled using a conventional known acidic or basic compound.

—Treatment Liquid—

The treatment liquid of the present invention contains a cationic polymer having reactivity to the pigment partially coated with the resin containing the structural unit represented by Formula (1) and the structural unit having an ionic group (the resin according to the present invention). The treatment liquid comes in contact with the ink composition when an image is formed, thus allowing dispersion components, in particular, pigment or resin particles to be aggregated in the ink composition and increasing the speed of image formation. In addition, the treatment liquid enables suitable inhibition of ink diffusion and formation of images with high density and high resolution.

(Cationic Polymer)

The treatment liquid of the present invention contains at least one cationic polymer having reactivity to the pigment partially or entirely coated with the resin of the present invention. The cationic polymer contained in the treatment liquid enables improvement of aggregability of the pigment coated with the resin in the ink composition of the present invention. As a result, abrasion resistance of images is remarkably improved.

The cationic polymer is preferably a polymer having a cationic group such as a primary, secondary or tertiary amino group, or a quaternary ammonium salt group. The cationic polymer is preferably a monopolymer of a monomer (cationic monomer) having a primary, secondary or tertiary amino group or a salt thereof, or a quaternary ammonium salt group, or a copolymer or polycondensate of the cationic monomer and another monomer (non-cationic monomer). In addition, the polymer may be used in the form of a water-soluble polymer or a water-dispersible latex particle.

Examples of the cationic polymer include polydiallyldimethylammonium chloride, polymethacryloyloxy-ethyl-β-hydroxyethyl dimethylammonium chloride, polyethyleneimine, polyallylamine and derivatives thereof, polyamide-polyamine resins, cationated starch, dicyandiamide formalin condensates, dimethyl-2-hydroxypropyl ammonium salt polymers, polyamidine, polyvinylamine, dicyane cationic resins typified by dicyandiamide-formalin polycondensates, polyamine-based cationic resins typified by dicyanamide diethylene triamine polycondensate, an epichlorohydrin-dimethylamine addition polymer, a dimethyldiamine ammonium chloride-$SO_2$ copolymer, a diallylamine salt-$SO_2$ copolymer, a (meth)acrylate-containing polymer having an alkyl group substituted with a quaternary ammonium salt group in an ester portion, and polyamine such as a styryl polymer having an alkyl group substituted with a quaternary ammonium salt group, a guanidine polymer, an epihalohydrin polymer and the like. Specific examples of suitable cationic polymers include diallyldimethylammonium chloride polymers, polyamines such as (meth)acrylate-containing polymers having a quaternary ammonium salt group in an ester portion, guanidine polymers (polymers having the structure of $(-NH-C(=NH)-NH-C(=NH)-NH-)_n$), and copolymers containing an epihalohydrin derivative and amine derivative (for example, copolymers of monomethylamine, monoethylamine, dimethylamine or diethylamine and epichlorohydrin).

Of these, a guanidine polymer such as polyguanidine is preferable and is suitable as a commercially available product (for example, BAQUACIL (trade name) and VANTOCIL (trade name) manufactured by Zeneca, Inc.). In addition, the epihalohydrin polymer is preferably polyepichlorohydrin and is preferably a commercially available product such as AMRES (trade name, manufactured by Georgia Pacific Resins, Inc., Atlanta, Ga.), KYMENE (trade name, manufactured by Hercules, Inc., Wilmington, Del.), Polycup (trade name, manufactured by Hercules, Inc.), or the like.

From the viewpoints of aggregability during image formation, the cationic polymer is preferably a guanidine polymer, an epihalohydrin polymer or polyamine, and is more preferably a guanidine polymer and an epihalohydrin polymer.

The cationic polymer preferably has a molecular weight (weight average molecular weight) of about 1,000 to about 50,000.

From the viewpoints of aggregation effect, the content of the cationic polymer in the treatment liquid is preferably from 0.01% by mass to 30% by mass, with respect to the total mass of the treatment liquid. The content of 0.01% by mass or more enables good aggregability to be obtained, and the content of 30% by mass or less is advantageous in terms of long-period stability over time of the treatment liquid.

The treatment liquid may further contain an aqueous solvent (for example, water) in addition to the cationic polymer.

—Physical Properties—

From the viewpoints of the rate of aggregation of the ink composition, the viscosity of the treatment liquid is preferably from 1 to 30 mPas, more preferably from 1 to 20 mPas, and even more preferably from 2 to 15 mPas, particularly preferably from 2 to 10 mPas.

The viscosity may be measured in the same manner as in the case of the ink composition.

From the viewpoints of the rate of aggregation of the ink composition, the surface tension of the treatment liquid is preferably from 20 mN/m to 60 mN/m, more preferably from 20 mN/m to 45 mN/m, particularly preferably from 24 mN/m to 40 mN/m.

The surface tension may be measured in the same manner as in the case of the ink composition.

<Method for Forming Image>

In the method for forming an image of the present invention, the ink set of the present invention is used, and the method for forming an image of the present invention includes applying the ink composition of the ink set to a recording medium by inkjetting, and applying the treatment liquid of the ink set to the recording medium.

In the present invention, the use of the aforementioned ink set enables excellent aggregability of components, in particular pigment, in the ink composition during image formation. For this reason, the formed image exhibits superior adherence to the recording medium and thus excellent abrasion resistance. In addition, use of the dispersant (the resin of the present invention) exhibiting superior adsorption to the pigment enables stable dispersibility and superior landing position precision of ink drops, thus solving ejection defects and obtaining high-quality images with inhibited white spots (decolorization) defects (in particular, decolorization of images in the case of using ink after storage).

—Recording Medium—

A porous or non-porous material may be used as the recording medium. Of these, a non-porous material is preferable from the viewpoints that it more efficiently exerts properties of the ink composition.

That is, the case where an image is generally formed on a non-porous material has a tendency to exhibit low image adherence, as compared to the case in which an image is formed on the porous material. In the present invention, the case where an image is formed on a non-porous material can also maintain image adherence and inhibit white spots (decolorization) defects of image.

Examples of porous material include plain paper and resin-coated paper, inkjet exclusive-use paper disclosed in those such as JP-A Nos. 8-169172, 8-27693, 2-276670, 7-276789, 9-323475, 62-238783, 10-153989, 10-217473, 10-235995, 10-217597 and 10-337947, electrophotographic common paper, fabrics, and the like.

Examples of non-porous material include plastic sheet materials, plastic film materials, metal materials, glass materials, plastic-coated papers and the like. Of these, plastic sheet materials, plastic film materials, metal materials and glass materials are preferable. Examples of materials of the plastic sheet or plastic film include synthetic resins such as polyester (for example, polyvinyl chloride, polyethylene terephthalate (PET), polybutyrene terephthalate, polyethylene naphthalate (PEN)), polycarbonate, polyarylate and triacetyl cellulose (TAC).

—Applying the Ink—

Applying the ink (hereinafter, also referred to "the ink applying process") of the present invention is carried out by applying the ink composition constituting the aforementioned ink set to a recording medium by inkjetting. In this process, desired visible images are formed by selectively applying the ink composition to the recording medium. Respective components of ink composition and preferred embodiments thereof have been described above.

The inkjet method may utilize the method described in the paragraphs [0093] to [0105] of JP-A No. 2003-306623.

In addition, the inkjet method is not particularly limited and may be any known type such as a charge control type in which an ink is ejected using electrostatic attractive force, a drop-on-demand type (pressure pulse type) using the oscillating pressure of a piezoelectric device, an acoustic inkjet type in which an electric signal is converted to an acoustic beam, an ink is exposed thereto and acoustic radiation pressure is used to eject the ink, and an inkjet type using a thermal inkjet print head wherein an ink is heated to form bubbles, and the resulting pressure is utilized to eject the ink. Of these, the inkjet type using a thermal inkjet print head is preferable from the viewpoints that it can further efficiently exert the ink properties of the present invention.

That is, since the inkjet method using a thermal inkjet print head requires better ink properties, as compared to other types, it further effectively exhibits decolorization inhibition or adherence improvement effect through the ink composition of the present invention.

The inkjet methods include a method in which a low concentration of ink referred to as "photoink" is ejected in plural small volumes, a method in which plural inks with substantially the same color and different concentration are used to improve image quality, and a method in which a colorless transparent ink is used.

—Applying the Treatment Liquid—

Applying the treatment liquid (hereinafter, also referred to "treatment liquid applying process") of the present invention is carried out by applying the aforementioned treatment liquid constituting the ink set to the recording medium before or after the ink applying process. The treatment liquid can promote aggregation of components in the ink composition. In the present invention, it is preferable that the treatment liquid comes in contact with the ink composition to form an image. In this case, when the treatment liquid comes in contact with the ink composition, the component in the ink composition (in particular, the pigment at least partially coated with the resin) aggregates to fix the image on the recording medium.

In addition, respective components in the treatment liquid and preferred embodiments thereof are the same as described above.

The application of treatment liquid may be carried out by any method capable of uniformly applying the treatment liquid selectively or over the entire surface of the recording medium. The treatment liquid may be applied by ejecting the treatment liquid from an ejection head by an inkjet method (inkjetting) in the same manner as the application of the ink composition, or a roll coating in which the treatment liquid is maintained on the surface of rotating roll and is transcribed to the surface of the recording medium.

—Fixing the Image—

It is preferable that the method for forming an image of the present invention further includes fixing the image (hereinafter, also referred to "fixing process"), in which the image-formed recording medium is heated to fix the image, after the ink applying process and treatment liquid applying process. The fixing (immobilization) applies superior texture such as glossiness of images and abrasion resistance (for example, adhesion to paper), thus obtaining images with superior image quality.

It is preferable that the fixing process is carried out by fixing an image by at least heating, more preferably, the fixing process is carried out by heating and pressing (hereinafter, referred to as "hot-pressing"). For example, the fixation of images by heating may be carried out by bringing the heating surface into contact with the image formed on the recording medium.

Preferably, the heating is carried out at a minimum film forming temperature (MFT) or higher of the polymer particle in the image. When the heating is performed at the MFT or higher, polymer particles form a reinforced thin film. The heating temperature is preferably within the temperature range of MFT or higher. Specifically, the heating temperature is preferably within the range of from 40° C. to 80° C., more preferably the range of from 50° C. to 75° C., even more preferably the range of from 55° C. to 70° C.

The minimum film forming temperature (MFT) of polymer particles is controlled by Tg of polymer and the type and amount of ink solvent and has generally a tendency to decrease, as Tg becomes lower, the I/O value of ink solvent becomes lower, and the amount of ink solvent increases.

The pressure applied during pressing with heating is preferably within the range of from 0.1 MPa to 3.0 MPa, more preferably, from 0.1 MPa to 1.0 MPa, and even more preferably, 0.1 MPa to 0.5 MPa in terms of surface smoothing.

The heating method is not particularly limited and examples thereof include non-contact type drying methods such as heating with a heat-generator such as a nichrome wire heater, supplying warm air or hot air, and heating with an apparatus such as a halogen lamp or an infrared lamp.

In addition, the method for hot-pressing is not particularly limited and suitable examples thereof include contact-type heating fixing such as pressing a hot plate on the image-forming surface of a recording medium and passing through a pair of rollers using a hot-pressing apparatus provided with a pair of hot-pressing rollers, a pair of hot-pressing belts, or a retaining roller arranged on the image-recording surface of the recording medium and a hot-pressing belt arranged opposite thereto.

In the case of hot-pressing, a nip period is preferably 1 millisecond to 10 seconds, more preferably 2 milliseconds to 1 second, more preferably 4 milliseconds to 100 milliseconds. In addition, a nip width is preferably 0.1 mm to 100 mm, more preferably 0.5 mm to 50 mm, even more preferably 1 mm to 10 mm.

The hot-pressing roller may be a metal roller made of a metal material, or may be provided with a coating layer made of an elastic body around a cored bar made of a metal material and optionally a surface layer (also referred to as a release layer). The cored bar may take the form of a cylindrical body made of an iron material, an aluminum material or a SUS material and the surface of cored bar is preferably at least partially coated with the coating layer. The coating layer is particularly preferably made of a silicone resin or fluorine resin. In addition, a heat-generating body is preferably mounted in the cored bar arranged at the one side of the hot-pressing rollers. The recording medium passes through rollers and thus is simultaneously heated and pressed, or the recording medium may be optionally heated between two heating rollers. The heat-generating body is preferably, for example, a halogen lamp heater, a ceramic heater, a nichrome wire or the like.

The belt substrate constituting the hot-pressing belt used for the hot-pressing apparatus is preferably seamless nickel-plated brass and the thickness thereof is preferably 10 μm to 100 μm. In addition, the belt substrate may use aluminum, iron, polyethylene or the like, in addition to nickel. In the case where a silicone resin or a fluorine resin is prepared, the thickness of layer formed using the resin is preferably 1 μm to 50 μm, more preferably 10 μm to 30 μm.

In addition, in order to realize the pressure (nip pressure), for example, an elastic member such as a spring may be mounted on both ends of roller such as a hot-pressing roller, to obtain the desired nip pressure in consideration of the nip gap.

In the case where a hot-pressing roller or a hot-pressing belt is used, the conveying speed of the recording medium is preferably within the range of from 200 mm/sec to 700 mm/sec, more preferably 300 mm/sec to 650 mm/sec.

EXAMPLES

Hereinbelow, the invention will be described in detail by way of Examples. However, the invention is not limited to these Examples as long as the scope of the invention is not impaired. In the description of examples, unless otherwise specified, "parts" refers to parts by mass, and "%" means % by mass.

In addition, the weight average molecular weight was measured by gel permeation chromatography (GPC). The GPC is carried out with HLC-8020 GPC (manufactured by Tosoh Corporation), three columns (trade name: TSKgel Super Multipore HZ-H, manufactured by Tosoh Corporation, 4.6 mm ID×15 cm), and THF (tetrahydrofuran) as the eluent. In addition, GPC conditions were as follows. The sample concentration was 0.45% by mass, the flow rate was 0.35 ml/min, the sample injection amount was 10 the measurement temperature was 40° C., and an IR detector was used. The calibration curve was prepared using eight samples "standard sample TSK standard, polystyrene": "F-40", "F-20", "F-4", "F-1", "A-5000", "A-2500", "A-1000", and "n-propyl benzene" manufactured by Tosoh Corporation.

—Synthesis of Resin Dispersant—
(1) Synthesis of Resin Dispersant P-1

88 g of methyl ethyl ketone was placed in a 1000-ml three-necked flask equipped with a stirrer and a cooling tube, heated to 72° C. under a nitrogen atmosphere. A solution prepared by dissolving 0.85 g of dimethyl-2,2'-azobisisobutylate, 50 g of phenoxyethyl methacrylate, 13 g of methacrylic acid, and 37 g of methyl methacrylate in 50 g of methyl ethyl ketone was added dropwise thereto over a period of 3 hours. After completion of the addition, the reaction was further continued for one hour, and then a solution prepared by dissolving 0.42 g of dimethyl-2,2'-azobisisobutylate in 2 g of methyl ethyl ketone was added thereto, and the solution was heated at 78° C. for 4 hours. The reaction solution thus obtained was reprecipitated twice in excess amounts of hexane, and the precipitated resin was dried to obtain 96.5 g of a phenoxyethyl methacrylate/methyl methacrylate/methacrylic acid (copolymerization ratio [mass ratio %]=50/37/13) copolymer (resin dispersant P-1).

The composition of the resin dispersant P-1 thus obtained was confirmed by $^1$H-NMR. Its weight average molecular weight (Mw) was 49,400 as determined by GPC. The acid number of the polymer was 30 mgKOH/g as determined by the method described in Japanese Industrial Standard (JIS K 0070:1992).

The resin dispersant P-1 was further synthesized at a varied monomer ratio. The acid value of each copolymer (resin dispersant) thus obtained was calculated in the same manner as described above and the results thus obtained are shown in Table 1~3.

(2) Synthesis of Resin Dispersant P-2 to P-4

Resin dispersants P-2, P-3, and P-4 were synthesized in the substantially same manner as in the synthesis of the resin dispersant P-1, except that phenoxyethyl methacrylate constituting the resin dispersant P-1 was changed to an equivalent amount of benzyl methacrylate (P-2), phenethyl methacrylate (P-3), or styrene (P-4). Plural resin dispersants P-2 were synthesized at varied monomer ratios.

The composition of the resin dispersants P-2, P-3 and P-4 thus obtained was confirmed by $^1$H-NMR. The weight average molecular weights (Mw) of the resin dispersants were 45300, 41000 and 42800, respectively, as determined by GPC. The acid numbers of resin dispersants P-2, P-3 and P-4 were 30 to 90 mg KOH/g, 70 mg KOH/g, 30 mg KOH/g, respectively, as determined by the method described in Japanese Industrial Standard (HS K 0070:1992), shown in Table below.

Example 1

Preparation of Resin-Coated Pigment Aqueous Dispersion 10 parts by mass of Pigment Blue 15:3 (PB, trade name: PHTHALOCYANINE BLUE A220, manufactured by Dainichiseika Color & Chemicals Mfg. Co., Ltd.), 4.5 parts by mass of the resin dispersant P-1, 18 parts by mass of methyl ethyl ketone (MEK), 4.2 parts by mass of 1N NaOH aqueous solution, and 63.3 parts by mass of ion exchange water were mixed together, dispersed, and passed through a dispersion apparatus (microfluidizer M-140K, 150 MPa) 10 times. Subsequently, the methyl ethyl ketone was removed at 55° C. under reduced pressure from the resulting dispersion and a part of water was further removed to obtain an aqueous dispersion of resin-coated pigment particles having a pigment concentration of 10.2% by mass. At this time, the remaining amount of MEK measured by gas chromatography was 180 ppm.

Measurement of Particle Size of Resin-Coated Pigment Particles

The volume average diameter of the resin-coated pigment particles thus obtained was measured using a NANOTRAC particle size distribution meter (trade name: UPA-EX150, manufactured by Nikkiso Co., Ltd.) by a dynamic light scattering method. The measurement was carried out by adding 10 ml of ionic exchange water to 10 μl of the resin-coated pigment particle aqueous dispersion to prepare a sample liquid for measurement and adjusting the temperature of sample liquid to 25° C. The measurement results are shown in Table 1~3 below.

—Preparation of Aqueous Ink 1—

Then, an aqueous ink 1 was prepared using the resin-coated pigment particle aqueous dispersion under the following composition (100 parts by mass in total). The aqueous ink 1 had a pH of 8.9 at 25° C. The pH was measured using a multifunction water quality meter MM-60R (trade name, manufactured by DKK-Toa Corporation). The amount of MEK in the aqueous ink 1 measured by gas chromatography was 45 ppm.

In addition, an image was formed and the prepared aqueous ink 1 was stored at 40° C. over a 3-month period.

<Composition of Aqueous Ink 1>

Resin-coated pigment particle aqueous dispersion (solid) . . . 3.0 parts

Dipropylene glycol . . . 12 parts 2-pyrrolidone . . . 6 parts 1,2-hexane diol . . . 4 parts Dipropylene glycol . . . 8 parts Orfin E1010 (trade name, manufactured by Nissin Chemical Industry, Co., Ltd.) . . . 1 part Ion exchange water . . . remainder (to adjust the total amount of the composition to 100 parts))

—Preparation of Treatment Liquid 1—

A treatment liquid 1 was prepared by mixing the following composition.

<Composition of Treatment Liquid 1>

VANTOCIL (manufactured by Zeneca, Inc.; polyguanidine) . . . 12.0 parts

Dantocol DHE . . . 3.0 parts

2-Pyrrolidone . . . 3.0 parts

Succinic acid . . . 2.0 parts

Surfynol 440 (manufactured by Nissin Chemical Industry, Co., Ltd.) . . . 0.3 parts Surfonyl 61 (manufactured by Nissin Chemical Industry, Co., Ltd.) . . . 0.25 parts EDTA . . . 0.55 parts Deionized water . . . remainder —Image Formation and Evaluation—

(1) Image Formation

An inkjet recording apparatus having prototype print heads each having 600 dpi and 256 nozzles was prepared and the treatment liquid 1 as the aqueous ink 1 stored for a predetermined period was loaded into the apparatus. The occurrence of decolorization and abrasion resistance was evaluated by the following method. The recording medium used was FX-L paper (manufactured by Fuji Xerox Co., Ltd.). The evaluation results are shown in Table 1~3.

(2) Evaluation 2-1. Abrasion Resistance (Image Adherence Test)

The treatment liquid 1 and the aqueous ink 1 were ejected in this order from separate heads onto the FX-L paper for 30 minutes to obtain image samples (5 cm×5 cm). The image surface of the samples thus obtained was wound on the outside of a paperweight (weight: 740 g, size of 15 mm×30 mm×120 mm), and evaluation samples were rubbed on unused embossed art paper three times back and forth (corresponding to load of 260 kg/m$^2$). The rubbed image surface was observed with the naked eye and adhesion of ink to the unused embossed art paper was determined as an abrasion resistance evaluation parameter. The evaluation was carried out in accordance with the following evaluation criteria:

<Evaluation Criteria>

A: No transfer from an image.

B: Slight transfer from an image.

C: Transfer from an image to an extent causing no practical problem.

D: Practically unacceptable transfer from an image.

2-2. White Spots (Decolorization)

The treatment liquid 1 and aqueous ink obtained were ejected in this order from separate heads onto the FX-L paper for 30 minutes. Subsequently, as a maintenance operation, the heads were subjected to a pressure of 15 KPa for 10 seconds, and wiped with CLEAN WIPER FF-390c (manufactured by Kuraray Co., Ltd.). Thereafter, ink ejection was further continued for 5 minutes, and the image (5 cm×5 cm) recorded on the FX-L paper after 5 minutes was observed. The observed image was evaluated based on the following visual observation criteria.

<Evaluation Criteria>
A: no white spots
B: two or less white spots
C: three to ten white spots
D: more than ten white spots Examples 2 to 27, Comparative Examples 1 to 5

Aqueous inks 2 to 32 were prepared in the same manner as in the aqueous ink 1 of Example 1 except that the kind and amount of pigment dispersant, and the kind and amount of cationic polymer of the aqueous ink 1 were changed as shown in Table 1~3 below. The aqueous inks 2 to 32 were subjected to image formation and evaluation. Evaluation results are shown in Table 1~3 below:

TABLE 1

| | | | Ink composition | | | | Treatment liquid | | | |
| | | | Pigment dispersant | | | Diameter of | Cationic polymer | | Evaluation | |
| | No. | Kind | Structural unit represented by Formula (1) | Acid value [mgKOH/g] | Content [parts] | pigment particle [μm] | Cationic compound | Content [parts] | White spot | Abrasion resistance |
|---|---|---|---|---|---|---|---|---|---|---|
| Ex. 1 | 1 | P-1 | Phenoxy ethylmethacrylate | 30 | 0.5 | 85 | Guanidine polymer | 12 | A | A |
| Ex. 2 | 2 | P-1 | Phenoxy ethylmethacrylate | 70 | 0.5 | 90 | Guanidine polymer | 12 | A | A |
| Ex. 3 | 3 | P-1 | Phenoxyethyl methacrylate | 90 | 0.5 | 88 | Guanidine polymer | 12 | B | A |
| Ex. 4 | 4 | P-1 | Phenoxyethyl methacrylate | 30 | 0.5 | 85 | Epihalohydrin polymer | 12 | B | A |
| Ex. 5 | 5 | P-1 | Phenoxyethyl methacrylate | 70 | 0.5 | 87 | Epihalohydrin polymer | 12 | A | A |
| Ex. 6 | 6 | P-1 | Phenoxyethyl methacrylate | 90 | 0.5 | 83 | Epihalohydrin polymer | 12 | A | A |
| Ex. 7 | 7 | P-1 | Phenoxyethyl methacrylate | 30 | 0.5 | 86 | Polyamine | 12 | B | B |
| Ex. 8 | 8 | P-1 | Phenoxyethyl methacrylate | 70 | 0.5 | 89 | Polyamine | 12 | B | B |
| Ex. 9 | 9 | P-1 | Phenoxyethyl methacrylate | 90 | 0.5 | 87 | Polyamine | 12 | A | B |
| Ex. 10 | 10 | P-2 | Benzyl methacrylate | 30 | 0.5 | 88 | Guanidine polymer | 12 | A | A |

Note:
Guanidine polymer: VANTOCIL (trade name, manufactured by Zeneca. Ltd.)
Epihalohydrin polymer: AMRES (trade name, manufactured by Georgia Pacific Resins. Inc.)
Polyamine: PAA-HCL-01 (trade name, manufactured by Nitto Boseki Co., Ltd.)

TABLE 2

| | | | Ink composition | | | | Treatment liquid | | | |
| | | | Pigment dispersant | | | Diameter of | Cationic polymer | | Evaluation | |
| | No. | Kind | Structural unit represented by Formula (1) | Acid value [mgKOH/g] | Content [parts] | pigment particle [μm] | Cationic compound | Content [parts] | White spot | Abrasion resistance |
|---|---|---|---|---|---|---|---|---|---|---|
| Ex. 11 | 11 | P-2 | Benzyl methacrylate | 70 | 0.5 | 88 | Guanidine polymer | 12 | B | A |
| Ex. 12 | 12 | P-2 | Benzyl methacrylate | 90 | 0.5 | 90 | Guanidine polymer | 12 | B | B |
| Ex. 13 | 13 | P-2 | Benzyl methacrylate | 30 | 0.5 | 92 | Epihalohydrin polymer | 12 | A | A |
| Ex. 14 | 14 | P-2 | Benzyl methacrylate | 70 | 0.5 | 86 | Epihalohydrin polymer | 12 | B | A |
| Ex. 15 | 15 | P-2 | Benzyl methacrylate | 90 | 0.5 | 81 | Epihalohydrin polymer | 12 | A | B |
| Ex. 16 | 16 | P-2 | Benzyl methacrylate | 30 | 0.5 | 86 | Polyamine | 12 | B | B |
| Ex. 17 | 17 | P-2 | Benzyl methacrylate | 70 | 0.5 | 87 | Polyamine | 12 | B | C |
| Ex. 18 | 18 | P-2 | Benzyl methacrylate | 90 | 0.5 | 84 | Polyamine | 12 | C | C |
| Ex. 19 | 19 | P-1 | Phenoxyethyl methacrylate | 30 | 0.8 | 93 | Epihalohydrin polymer | 2 | B | A |
| Ex. 20 | 20 | P-1 | Phenoxyethyl methacrylate | 30 | 0.8 | 88 | Epihalohydrin polymer | 12 | A | A |

Note:
Guanidine polymer: VANTOCIL (trade name, manufactured by Zeneca. Ltd.)
Epihalohydrin polymer: AMRES (trade name, manufactured by Georgia Pacific Resins. Inc.)
Polyamine: PAA-HCL-01 (trade name, manufactured by Nitto Boseki Co., Ltd.)

TABLE 3

| | | | Ink composition | | | | Treatment liquid | | Evaluation | |
|---|---|---|---|---|---|---|---|---|---|---|
| | | | Pigment dispersant | | | Diameter of | Cationic polymer | | | |
| | No. | Kind | Structural unit represented by Formula (1) | Acid value [mgKOH/g] | Content [parts] | pigment particle [μm] | Cationic compound | Content [parts] | White spot | Abrasion resistance |
| Ex. 21 | 21 | P-1 | Phenoxyethyl methacrylate | 30 | 1.5 | 81 | Epihalohydrin polymer | 2 | B | B |
| Ex. 22 | 22 | P-1 | Phenoxyethyl methacrylate | 30 | 1.5 | 87 | Epihalohydrin polymer | 12 | A | A |
| Ex. 23 | 23 | P-3 | Phenethyl methacrylate | 70 | 0.5 | 90 | Epihalohydrin polymer | 12 | B | C |
| Ex. 24 | 24 | P-3 | Phenethyl methacrylate | 70 | 0.5 | 95 | Guanidine polymer | 12 | B | B |
| Ex. 25 | 25 | P-3 | Phenethyl methacrylate | 70 | 0.5 | 93 | Polyamine | 12 | C | C |
| Ex. 26 | 26 | P-1 | Phenoxyethyl methacrylate | 110 | 0.5 | 85 | Epihalohydrin polymer | 12 | B | C |
| Ex. 27 | 27 | P-1 | Phenoxyethyl methacrylate | 10 | 0.5 | 87 | Epihalohydrin polymer | 12 | C | B |
| Comp. Ex. 1 | 28 | P-4 | Styrene | 30 | 0.5 | 94 | Epihalohydrin polymer | 12 | D | D |
| Comp. Ex. 2 | 29 | P-4 | Styrene | 30 | 0.5 | 85 | Guanidine polymer | 12 | D | D |
| Comp. Ex. 3 | 30 | P-4 | Styrene | 30 | 0.5 | 83 | Polyamine | 12 | D | D |
| Comp. Ex. 4 | 31 | P-1 | Phenoxyethyl methacrylate | 70 | 0.5 | 91 | 2-propanol | 12 | D | D |
| Comp. Ex. 5 | 32 | P-2 | Benzyl methacrylate | 70 | 0.5 | 95 | 2-propanol | 12 | D | D |

Note:
Guanidine polymer: VANTOCIL (trade name, manufactured by Zeneca. Ltd.)
Epihalohydrin polymer: AMRES (trade name, manufactured by Georgia Pacific Resins. Inc.)
Polyamine: PAA-HCL-01 (trade name, manufactured by Nitto Boseki Co., Ltd.)

As can be seen from Table 1~3, the images of Examples which were formed by ejecting an aqueous ink using the pigment coated with the non-water-soluble resin having the structural unit represented by Formula (1) and the structural unit having an ionic group, together with the treatment liquid using a cationic polymer, using an inkjet system and bringing the two liquids into contact to cause aggregation exhibited no white spots (decolorization) defects and superior abrasion resistance.

In addition, although the case in which cyan ink was prepared as the aqueous ink was described in Examples above, various colors of aqueous ink such as black ink, magenta ink, and yellow ink can be obtained in the same process as in Examples except that the kind (color) of pigment used is used instead of the cyan ink and the same results and effects can be thus obtained. In addition, multicolored images can be recorded in the aforementioned manner by loading two or more aqueous inks with different colors on an inkjet system and the same results and effects can be thus obtained.

In addition, although a guanidine polymer, an epihalohydrin polymer or polyamine is used as the cationic polymer contained in the treatment liquid in Examples above, the same results can be also obtained in the case of using other cationic polymers.

The present invention provides an ink set which can stably maintain ejection property when it is ejected by inkjetting, and at the same time, inhibit white spots (decolorization) defects of images and exhibit superior abrasion resistance of images, as compared to the case of conventional ink set. In addition, the present invention provides a method for forming an image which exhibits excellent landing position precision of ink and suppression of white spots (decolorization) defects of images, and which forms images with superior abrasion resistance.

Hereinafter, exemplary embodiments of the invention related to the first aspect will be described. However, the invention is not limited to the following embodiments.

<1> An ink set including: an ink composition containing at least water, a pigment, and a resin at least partially coating a surface of the pigment and having a structural unit represented by the following Formula (1) and a structural unit having an ionic group; and a treatment liquid containing a cationic polymer having reactivity to the pigment at least partially coated with the resin.

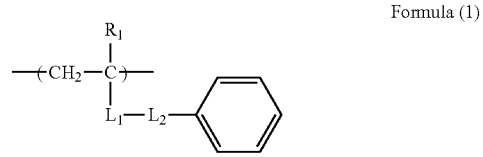

Formula (1)

In the Formula (1), $R_1$ represents a hydrogen atom, a methyl group or a halogen atom;

$L_1$ represents *—COO—, *—OCO—, *—CONR$_2$—, *—O—, or a substituted or unsubstituted phenylene group;

$R_2$ represents a hydrogen atom or an alkyl group having 1 to 10 carbon atoms;

the symbol "*" in the $L_1$ represents a bond linked to the main chain; and $L_2$ represents a single bond or a bivalent linking group having 1 to 30 carbon atoms.

<2> The ink set described in <1>, wherein the acid value of the resin is within the range of from 30 mg KOH/g to 95 mg KOH/g.

<3> The ink set described in <1> or <2>, wherein the structural unit represented by Formula (1) is a structural unit derived from at least one of benzyl(meth)acrylate or phenoxyethyl(meth)acrylate.

<4> The ink set described in any one of <1> to <3>, wherein the content of the resin in the ink composition is from 0.01% by mass to 10% by mass with respect to the solid concentration of the pigment.

<5> The ink set described in any one of <1> to <4>, wherein the content of the cationic polymer in the treatment liquid is from 0.01% by mass to 30% by mass with respect to the total mass of the treatment liquid.

<6> The ink set described in any one of <1> to <5>, the cationic polymer is a guanidine polymer or an epihalohydrin polymer.

<7> The ink set described in any one of <1> to <6>, wherein the resin is formed by phase inversion emulsification and contains 10 ppm to 100 ppm of methyl ethyl ketone, based on the mass of the ink composition.

<8> The ink set described in any one of <1> to <7>, wherein the structural unit having an ionic group is a structural unit derived from acrylic acid or methacrylic acid.

<9> The ink set described in any one of <1> to <8>, wherein the resin further contains a structural unit derived from alkyl(meth)acrylate having 1 to 6 carbon atoms.

<10> A method for forming an image using the ink set described in any one of <1> to <9> including applying the ink composition of the ink set to a recording medium by inkjetting; and applying the treatment liquid of the ink set to the recording medium.

<11> The method described in <10>, wherein an image is formed by performing the applying of the treatment liquid and then performing the applying of the ink, thereby bringing the ink composition into contact with the treatment liquid by applying the ink composition to the recording medium that has already been applied with the treatment liquid.

<12> The method described in <10> or <11>, further including fixing the image formed by the applying of the ink by at least heating.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set comprising:
   an ink composition containing at least water, a pigment, and a resin at least partially coating a surface of the pigment and having a structural unit represented by the following Formula (1) and a structural unit having an ionic group; and
   a treatment liquid comprising a cationic polymer having reactivity to the pigment at least partially coated with the resin,

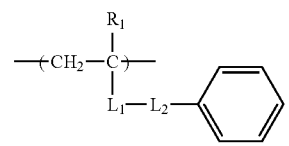

Formula (1)

wherein, in Formula (1), $R_1$ represents a hydrogen atom, a methyl group or a halogen atom; $L_1$ represents *—COO—, *—COO—, *—CONR$_2$—, *—O—, or a substituted or unsubstituted phenylene group; $R_2$ represents a hydrogen atom or an alkyl group having 1 to 10 carbon atoms; the symbol "*" in the $L_1$ represents a bond linked to the main chain; and $L_2$ represents a single bond or a bivalent linking group having 1 to 30 carbon atoms; and wherein the resin is formed by a phase inversion emulsification method and contains from 10 ppm to 100 ppm of methyl ethyl ketone, based on the mass of the ink composition.

2. The ink set according to claim 1, wherein an acid value of the resin is within the range of from 30 mg KOH/g to 95 mg KOH/g.

3. The ink set according to claim 1, wherein the structural unit represented by the Formula (1) is a structural unit derived from at least one of benzyl(meth)acrylate or phenoxyethyl (meth)acrylate.

4. The ink set according to claim 1, wherein the content of the resin in the ink composition is from 0.01% by mass to 10% by mass with respect to the solid concentration of the pigment.

5. The ink set according to claim 1, wherein the content of the cationic polymer in the treatment liquid is from 0.01% by mass to 30% by mass with respect to the total mass of the treatment liquid.

6. The ink set according to claim 1, the cationic polymer is a guanidine polymer or an epihalohydrin polymer.

7. The ink set according to claim 1, wherein the structural unit having an ionic group is a structural unit derived from acrylic acid or methacrylic acid.

8. The ink set according to claim 1, wherein the resin further comprises a structural unit derived from alkyl(meth) acrylate having 1 to 6 carbon atoms.

9. A method for forming an image using the ink set according to claim 1, the method comprising:
   applying the ink composition of the ink set to a recording medium by inkjetting; and
   applying the treatment liquid of the ink set to the recording medium.

10. The method according to claim 9, wherein an image is formed by performing the applying of the treatment liquid and then performing the applying of the ink, thereby bringing the ink composition into contact with the treatment liquid by applying the ink composition to the recording medium that has already been applied with the treatment liquid.

11. The method according to claim 9, further comprising fixing the image formed by the applying of the ink by at least heating.

* * * * *